(12) United States Patent
Roth

(10) Patent No.: US 9,065,981 B2
(45) Date of Patent: Jun. 23, 2015

(54) PASSENGER MONITORING AND DIRECTING SYSTEM FOR USE IN AN AIRCRAFT CABIN

(71) Applicant: AIRBUS OPERATIONS GMBH, Hamburg (DE)

(72) Inventor: Ingo Roth, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 401 days.

(21) Appl. No.: 13/693,771

(22) Filed: Dec. 4, 2012

(65) Prior Publication Data

US 2013/0162831 A1   Jun. 27, 2013

Related U.S. Application Data

(60) Provisional application No. 61/568,670, filed on Dec. 9, 2011.

(30) Foreign Application Priority Data

Dec. 9, 2011   (DE) .......................... 10 2011 120 764

(51) Int. Cl.
    *H04N 7/18*   (2006.01)
(52) U.S. Cl.
    CPC ...................................... *H04N 7/18* (2013.01)

(58) Field of Classification Search
    CPC ......................................................... H04N 7/18
    USPC ................. 348/151, 143, 148, 149, 152, 153; 386/224, 336, 230
    See application file for complete search history.

(56) References Cited

U.S. PATENT DOCUMENTS

| | | | |
|---|---|---|---|
| 6,499,866 B1 | 12/2002 | Logan | |
| 6,972,694 B2 | 12/2005 | Carroll | |
| 2006/0075934 A1 | 4/2006 | Ram | |
| 2008/0117297 A1 | 5/2008 | Torres | |
| 2012/0041951 A1* | 2/2012 | Sauvalle et al. | ............... 707/737 |

FOREIGN PATENT DOCUMENTS

EP        2 169 642        3/2010

* cited by examiner

*Primary Examiner* — Robert Chevalier
(74) *Attorney, Agent, or Firm* — Dickinson Wright PLLC

(57) ABSTRACT

A passenger monitoring and directing system for use in an aircraft cabin is provided. This system includes at least one information unit to be arranged in the aircraft cabin and at least one passenger monitoring device. The information unit includes at least one monitoring portion and the passenger monitoring device is assigned to the information unit and arranged relative to its monitoring portion in order to monitor the passengers through the monitoring portion of the information unit.

12 Claims, 2 Drawing Sheets

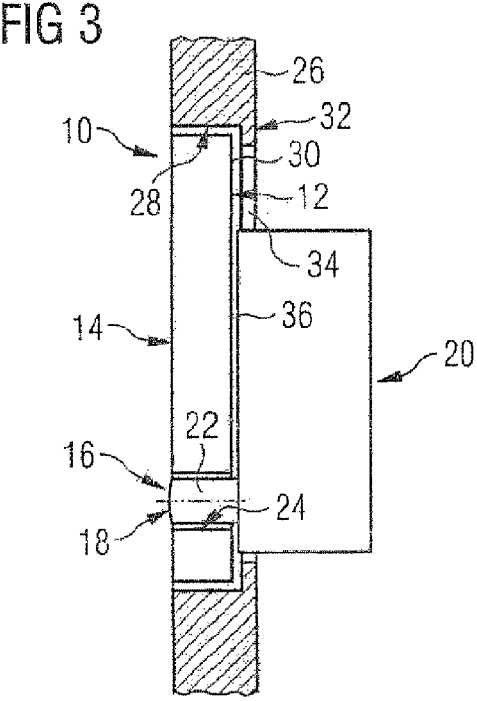
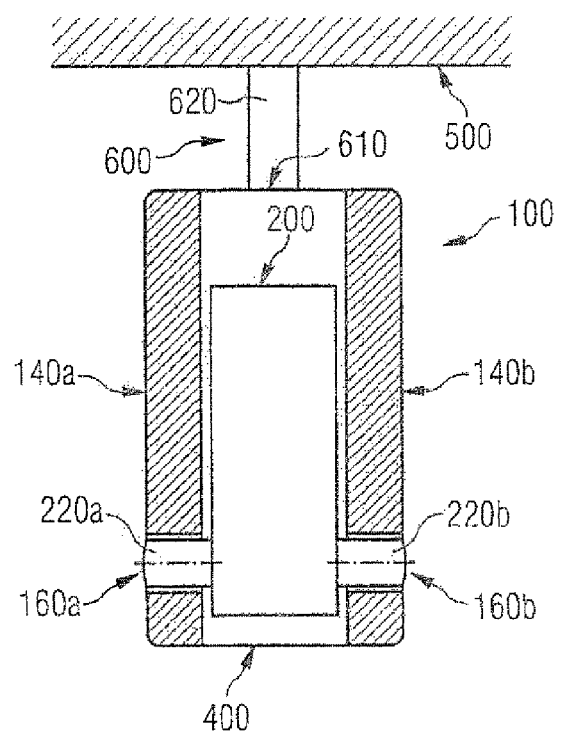

PASSENGER MONITORING AND DIRECTING SYSTEM FOR USE IN AN AIRCRAFT CABIN

CROSS REFERENCE TO RELATED APPLICATIONS

This application is entitled to and claims priority of U.S. 61/568,670 filed Dec. 9, 2011 and DE 10 2011 120 764.7 filed Dec. 9, 2011, the disclosures of each of which, including the specification, drawings and abstract, are incorporated herein by reference in their entirety.

FIELD

The invention relates to a passenger monitoring and directing system for use in an aircraft cabin and to the use of the system in the aircraft cabin.

BACKGROUND

At present, passenger monitoring and directing systems installed in modern commercial aircraft comprise at least one information means, such as for example an exit sign, which is arranged in an aircraft cabin, and at least one camera for monitoring the aircraft cabin. In these systems, the information means and the camera are in each case provided as separate components arranged at different positions in the aircraft cabin. As a result of the fact that the camera is installed as a separate apparatus in the aircraft cabin, the camera is visually conspicuous and it is obvious to passengers that they are being observed. Owing to the visual conspicuousness, such camera apparatuses are also susceptible to destruction by passengers who do not wish to be observed.

In the case of the cameras used hitherto, which are installed as separate apparatuses in different modules in the cabin, the installation site at which the camera is to be installed in the cabin must be taken into account even during the design of the cameras. Consequently, the cameras, which are to be installed for example in the cockpit door, in the crew rest compartment, in partition walls or door frame coverings, are subject to varying structural requirements, which increases their manufacturing cost. Furthermore, owing to the arrangement of the cameras separately from other safety-related components, such as information signs and loudspeakers, extra cable routes to the module and inside the module in which the camera is installed are necessary.

An improved safety system with regard to the number and arrangement of components is already known from the field of building safety engineering. Specifically, U.S. Pat. No. 6,499,866 B1 describes the combined design of emergency lighting and an illuminated emergency exit sign in one apparatus. This combined design of emergency lighting and emergency exit sign has the result that safety-related upgrading of buildings and also maintenance of the safety system are simplified.

Through the combination apparatus of U.S. Pat. No. 6,499,866 B1, two apparatuses are simply joined together in one housing, in order to share their essential elements, such as lighting means and batteries.

A solution to the aforementioned problems of present-day passenger monitoring and directing systems for use in an aircraft cabin is, however, not offered by this combination apparatus either.

SUMMARY

The object on which the present invention is therefore based is to provide a passenger monitoring and directing system for use in an aircraft cabin which solves the problems of the conspicuousness and the varying design of cameras in the aircraft cabin.

This object is achieved by a passenger monitoring and directing system for use in an aircraft cabin having the features of Claim 1 and the use of the system in an aircraft cabin having the features of Claim 13.

A passenger monitoring and directing system according to the invention for use in an aircraft cabin comprises at least one information means which is to be arranged in the aircraft cabin and which is suitable for directing passengers in a manner desired according to information. This information means may be, for example, an emergency exit direction sign or an emergency exit door sign. A large number of these are provided in the aircraft cabin for approval reasons. Emergency exit signs are provided in the region of the emergency exits, with at least the emergency exit direction signs being visible from the regions of the aircraft cabin in which passengers and/or crew members are normally situated during a flight.

Furthermore, the passenger monitoring and directing system comprises at least one passenger monitoring device which is suitable for monitoring the passengers in the aircraft cabin. Preferably, this passenger monitoring device is a camera. Any other apparatus which is suitable for monitoring the aircraft cabin is, however, also conceivable for the passenger monitoring.

According to the invention, the information means comprises at least one monitoring portion and the passenger monitoring device is assigned to the information means and arranged relative to its monitoring portion in order to monitor the passengers through the monitoring portion of the information means. According to a preferred embodiment, a passenger monitoring device is directly integrated into an information means, such as an emergency exit direction sign or an emergency exit door sign, and thus preferably at least partially received in a housing of the information means. According to an alternative embodiment, the passenger monitoring device is not received directly in a housing of the information means, but positioned as a separate component, in the line of sight of the passengers looking at the information of the information means, behind the information means. In both cases, owing to the combined design with the information means, the passenger monitoring device is no longer visually perceptible and thus no longer annoying to the passengers. Also, in both cases, complex cable routes to the hitherto separate installation sites of cameras and information signs, installation space and thus also weight are reduced.

Preferably, the passenger monitoring device comprises at least one passenger detecting element which is integrated into the at least one monitoring portion of the information means in order to detect the passengers in the aircraft cabin. This passenger detecting element is preferably an objective in the case of a passenger monitoring device formed as a camera.

The monitoring portion of the information means may have at least one viewing window and/or at least one cutout, through which the passenger monitoring device monitors the passengers. In particular, the viewing window and/or the cutout may be formed in at least one information display element of the information means which indicates the information for directing the passengers. In this case, it is advantageous if the cutout is formed in a manner corresponding to the passenger detecting element of the passenger monitoring device, so that the passenger detecting element can be introduced into the cutout and thus integrated into the information means. The cutout may be covered by a viewing window in the direction towards the aircraft cabin. The viewing window may be a section of the information display element or the transparent cover thereof. If the information display element is formed, for example, as a light guide, the viewing window may be a transparent region of the information display element. The cutout in the information display element is, however, not absolutely essential provided that the information display element does not obstruct monitoring of the passengers in the aircraft cabin through the monitoring portion of the information means. The same also applies to the viewing window.

In a preferred embodiment, the information means comprises a first and a second information display element and the passenger monitoring device is received between the first and the second information display element. In this case and also in general, i.e. irrespective of this specific embodiment, the information display element may be, for example, a screen, a light guide or generally a preferably backlit sign.

In this embodiment, it is particularly preferable for the passenger monitoring device to be designed to monitor the passengers both through the first information display element and through the second information display element. For this purpose, the passenger monitoring device may have a first and a second passenger detecting element, which may be designed and arranged relative to each information display element or in each case integrated into an information display element, as described above.

Preferably, the passenger monitoring device in this embodiment is received in a housing of the information means which also holds the two information display elements. This now makes it possible, for example, for the passenger monitoring to take place not directly through the information display element, but rather for the housing to have, for holding the two information display elements, in each case one frame around each of the information display elements and preferably in each case at least one above-defined monitoring portion to be provided in each of these frames. This is advantageous, for example, when the passenger monitoring through a monitoring portion in the information display element would be disrupted by rays of light serving to display the information. It is, however, also conceivable that passenger monitoring may take place in the remaining housing region of the information means, i.e. for example between the two information display elements. For example, the passenger monitoring device may have an additional passenger detecting element for this purpose. For the aforementioned alternative or additional possibilities for passenger monitoring, the housing may comprise, at at least one suitable location, a viewing window and/or a cutout which enables passenger detection. Generally speaking, the housing of the information means may also have at least one monitoring portion, through which the passenger monitoring device is able to monitor the passengers in the aircraft cabin.

Also irrespective of the above-described configuration of the information means with two information display elements, the information means may comprise a housing in which the passenger monitoring device is at least partially received. Passenger monitoring may take place, as described in the preceding paragraph, also through this housing. At least, however, it is advantageous if the passenger monitoring device assigned to the information means, despite separate housings, is attached to the information means in such a manner that it is possible to handle the passenger monitoring and directing system as though the information means and the passenger monitoring device were a single component. Also with separate housings, it is conceivable for at least one monitoring portion of the information means to be formed, as described in the preceding paragraph, in a housing, in particular housing frame, of the information means.

For the monitoring of the aircraft cabin, it is particularly advantageous if the information means is arranged on or in a cabin panel of an aircraft. Through the assignment and relative arrangement of the passenger monitoring device to the information means, the passenger monitoring device is consequently also arranged in the region of the aircraft in which the information means is arranged. Particularly preferably, the information means is arranged on a cabin ceiling portion, in particular a ceiling panel of the aircraft cabin, or on a cabin wall portion, in particular a wall panel of the aircraft cabin. These are customary regions in which it is in any case compulsory for reasons of approval to provide information means, such as in particular the emergency exit signs.

The mounting of the information means on or in a desired cabin portion of the aircraft takes place in a manner known for the information means. For example, an information means to be mounted on a wall panel of the aircraft cabin may be inserted into a corresponding cutout in the wall panel. It is understood that the cutout also allows the reception of the passenger monitoring device assigned to the information means and the arrangement of the passenger monitoring device relative to the information means.

If the information means is to be mounted on a ceiling panel of the aircraft cabin, the information means may be mounted, by means of a corresponding fastening means formed for example as a connecting web, on the ceiling panel. In this case, it is preferable for the fastening means to serve simultaneously as a cable duct for running cables between the ceiling panel and the information means. In the case of a ceiling mounting, in particular the configuration of the information means with the two information display elements is preferred, in particular in each case one of the two information display elements being visible from one region of the aircraft cabin and the other from an opposite region of the aircraft cabin.

Generally and irrespective of the above-described ceiling mounting, the information display elements in the embodiment of the information means with two information display elements are preferably always to be arranged such that one information display element is visible from one region of the aircraft cabin and the second display element from an opposite region of the aircraft cabin.

A second aspect of the present invention is the use of the above-described passenger monitoring and directing system in an aircraft cabin.

Through the passenger monitoring and directing system according to the invention, the following advantages, inter alia, are achieved. Through the combination of the information means with the passenger monitoring device, a joint and thus no longer separate use in the aircraft cabin is possible, in particular in the regions in which information means are to be provided in any case for reasons of approval. Through the combination, furthermore, less installation space is taken up, since the information means and the passenger monitoring device are no longer arranged, as hitherto, as separate apparatuses in different regions of the aircraft cabin. Furthermore, the feeling that the passengers have of being observed is avoided, since the monitoring now takes place with "hidden" devices. Possible vandalism is thereby counteracted at the same time. Furthermore, maintenance work on the passenger monitoring and directing system can be carried out more efficiently than hitherto, since the information means and the passenger monitoring device are provided together in an installation space and thus can be removed and maintained at the same time. Advantageously, material can also be saved, since separate fastenings, in some cases also housings and above all cable routes, can be dispensed with through the combination of information means and passenger monitoring device. This results in a weight reduction and thus also a cost saving.

BRIEF DESCRIPTION OF THE DRAWINGS

Preferred embodiments of the invention will now be explained in more detail with reference to the appended schematic drawings, of which:

FIG. 3 shows a side view of an information means installed in an aircraft cabin wall portion and having a passenger monitoring device assigned to the information means, and their arrangement relative to one another, according to a first embodiment of the present invention, and FIG. 4 shows a second embodiment of the present invention, in which the information means together with the assigned passenger monitoring device is mounted on a cabin ceiling portion.

DETAILED DESCRIPTION OF EMBODIMENTS

Figure 1:
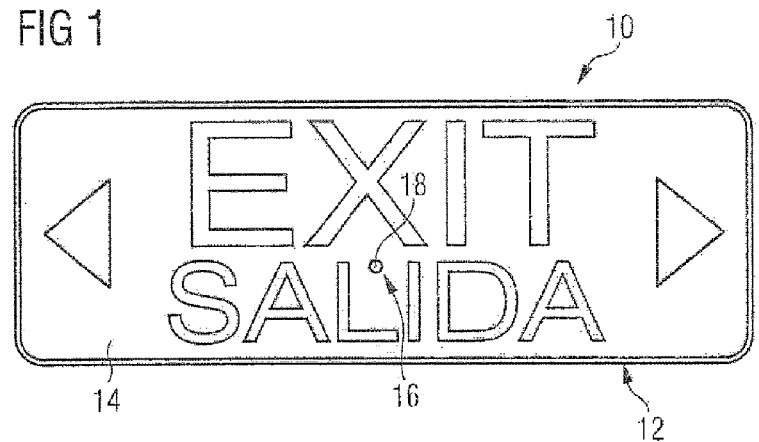
FIG. 1 shows a front view of an information means according to the present invention.

In FIG. 1, a front view of an information means 10 of the passenger monitoring and directing system, according to the invention, for use in an aircraft cabin is shown. The information means 10 comprises a housing 12 and an information display element 14. The information display element 14 serves for displaying information for passengers in an aircraft cabin. The information means illustrated in FIG. 1 is an emergency exit direction sign. Specifically, it is an emergency exit direction sign bearing the words "EXIT" and "SALIDA" and showing two arrows which indicate the directions to nearest (emergency) exits.

In a region of the information display element 14 which does not interfere with the information to be displayed, a monitoring portion 16 is provided. This monitoring portion 16 is situated, in FIG. 1, approximately in the centre below the information "Exit" in the information element 14 and thus affords a good position for observation of the aircraft cabin.

The information display element 14 may be, for example, a plate which has transparent portions at least in regions of the information to be displayed and which, in the operating state of the information means, is to be backlit by a lighting means (not illustrated) so that the information is visible to the passengers. The information element 14 may, however, also be a light guide which is designed to display information in a manner visible to the aircraft passengers. Furthermore, other configurations of the information means 10 are also conceivable. Irrespective of the specific configuration of the information display element 14, the monitoring portion 16 comprises a viewing region in the form of a circular viewing window 18 which allows monitoring of the passengers in the aircraft cabin by means of a passenger monitoring device 20 (see FIG. 2) through the monitoring portion 16.

Figure 2:
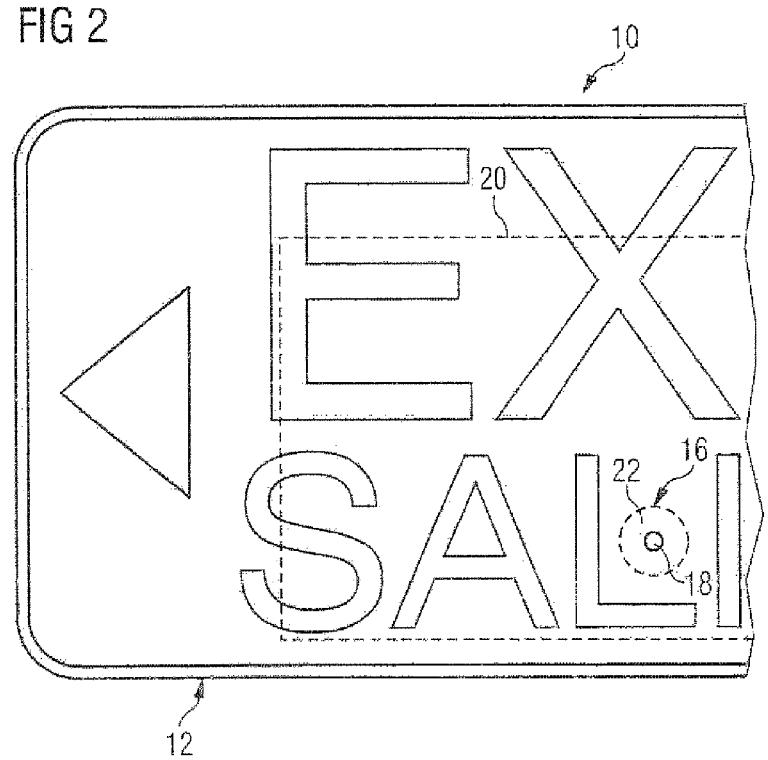
FIG. 2 shows a portion of the information means from FIG. 1, in which the passenger monitoring device assigned to the information means is indicated in its arrangement relative to the information means.

As indicated in FIG. 2, the passenger monitoring device 20, which comprises at least one passenger detecting element 22, is assigned to the information means 10. The passenger monitoring device 20 is preferably a camera and the passenger detecting element 22 is preferably an objective of the camera. The passenger monitoring device 20 is arranged relative to the information means 10 in such a manner that its passenger detecting element 22 is arranged, in the line of sight of a passenger looking at information displayed by the information means 10, behind the information display element 14 and especially in the region of that portion of the monitoring portion 16 which is formed as the viewing window 18. This special relative arrangement allows detection and monitoring of aircraft passengers through a surface region of the information means 10, without the passengers being aware of this monitoring.

As is evident from FIG. 3, the information means 10 may have a cutout 24 designed to receive the passenger detecting element 22 of the passenger monitoring device 20. Through the reception of the passenger detecting element 22 in this cutout 24, the passenger detecting element 22 of the passenger monitoring device 20 can be integrated into the monitoring portion 16 of the information means 10.

As is evident from FIG. 3, it is preferable for the region of the cutout 24 in the region of the monitoring portion 16 to be covered by the viewing window 18 in the direction towards the aircraft cabin. This has the advantage, on the one hand, that the passenger detecting element 22 is thereby not directly visible to the passengers in the aircraft cabin, and on the other hand helps to prevent dirt from entering the cutout 24 in which the passenger detecting element 22, as shown in FIG. 3, can be received.

In FIG. 3, the information means 10 is shown received in a wall panel 26 of the aircraft cabin. This wall panel 26 has, for receiving and holding the information means 10, a corresponding receiving cutout 28 designed to receive and hold the information means 10. In a region 30 of the information means 10 facing away from the information display element 14, the information means 10 lies against a flange-like boundary 32 of the wall panel 26, which boundary bounds the receiving cutout 28 in the direction towards a side of the wall panel 26 facing away from the aircraft cabin. However, this flange-like boundary 32 leaves open a through-opening 34 towards the side of the wall panel 26 facing away from the aircraft cabin, so that there is created a receiving space which is also able to receive the passenger monitoring device 20, which in FIG. 3 is arranged at a rear side 36 of the information means 10 bounding the information means 10 at a side of the same facing away from the information display element 14. In the embodiment, shown in FIG. 3, of the combination of the information means 10 with the passenger monitoring device 20 in the passenger monitoring and directing system according to the invention, the installation space in a cabin wall portion of the aircraft is therefore configured to receive and hold the passenger monitoring device 20, arranged at the rear side 36 of the information means 10 and preferably also fastened there, together with the information means 10. At the same time, through the through-opening 34 in the wall panel 26, simple cabling of the information means 10 and of the passenger monitoring device 20 can take place via already existing cable routes (not illustrated).

In FIG. 4, an alternative embodiment of an information means 100 in combination with a passenger monitoring device 200 of the passenger monitoring and directing system according to the invention is shown. According to the alternative embodiment shown in FIG. 4, the information means 100 comprises a first and a second information display element 140a and 140b, as well as a passenger monitoring device 200 received between the two information display elements 140a, 140b. The two information display elements 140a, 140b are held in a housing 400 of the information means 100 opposite one another and facing away from one another. The passenger monitoring device 200 is also received in the housing 400.

According to the alternative embodiment of FIG. 4, the passenger monitoring device 200 has a first and a second passenger detecting element 220a, 220b. The integration of these detecting elements 220a, 220b in monitoring portions 160a, 160b of the information means 100 takes places in each case as described above with reference to FIG. 3. Likewise, the further features of the first embodiment regarding the passenger detecting element 22 and the monitoring portion 16 are in each case analogously applicable also to the alternative embodiment of FIG. 4, i.e. to each of the two information display elements 140a, 140b. Repetition of the same is therefore dispensed with.

The alternative embodiment of FIG. 4 is preferably designed to be mounted on a cabin ceiling portion 500 of the aircraft cabin. For this purpose, the passenger monitoring and directing system shown in FIG. 4 has a fastening means 600 suitable for engaging by its one end 610 on a housing portion 410 of the housing 400 of the information means 100, in order to fasten the latter by means of its end 620 facing away from this housing portion 410 to the cabin ceiling portion 500. Particularly preferably, the fastening means 600 is of web-shaped form and has a cable duct (not shown) for running cables between the passenger monitoring and directing system according to the invention and a cable route (not illustrated) provided on a side of the cabin ceiling portion 500 facing way from the passenger cabin.

Finally, it should also be pointed out that the features of the passenger monitoring and directing system according to the invention for use in an aircraft cabin, which are described above in the general description section and the figure description section, can be combined as desired with one another, even if some features have merely been described independently of one another.

The invention claimed is:

1. Passenger monitoring and directing system for use in an aircraft cabin, comprising:
   at least one information means to be arranged in the aircraft cabin and
   at least one passenger monitoring device,
the information means comprising at least one monitoring portion, and the passenger monitoring device being assigned to the information means and arranged relative to its monitoring portion in order to monitor the passengers through the monitoring portion of the information means.

2. Passenger monitoring and directing system according to claim 1, the passenger monitoring device comprising at least one passenger detecting element which is integrated into the at least one monitoring portion of the information means.

3. Passenger monitoring and directing system according to claim 1, the monitoring portion of the information means having at least one of at least one viewing window and at least one cutout.

4. Passenger monitoring and directing system according to claim 3, the at least one of the viewing window and the cutout being formed in at least one information display element of the information means.

5. Passenger monitoring and directing system according to claim 1, the information means comprising a first and a second information display element and the passenger monitoring device being received between the first and the second information display element.

6. Passenger monitoring and directing system according to claim 1, the information means comprising a housing in which the passenger monitoring device is at least partially received.

7. Passenger monitoring and directing system according to claim 1, the passenger monitoring device being a camera.

8. Passenger monitoring and directing system according to claim 7, the at least one passenger detecting element being an objective.

9. Passenger monitoring and directing system according to claim 1, the information means pointing a way to an exit or indicating an exit.

10. Passenger monitoring and directing system according to claim 1, the information means being arranged on a cabin ceiling portion, in particular a ceiling panel of the aircraft cabin.

11. Passenger monitoring and directing system according to claim 1, the information means being arranged on a cabin wall portion, in particular a wall panel of the aircraft cabin.

12. Use of a passenger monitoring and directing system according to claim 1 in an aircraft cabin.

* * * * *